Figure 1:
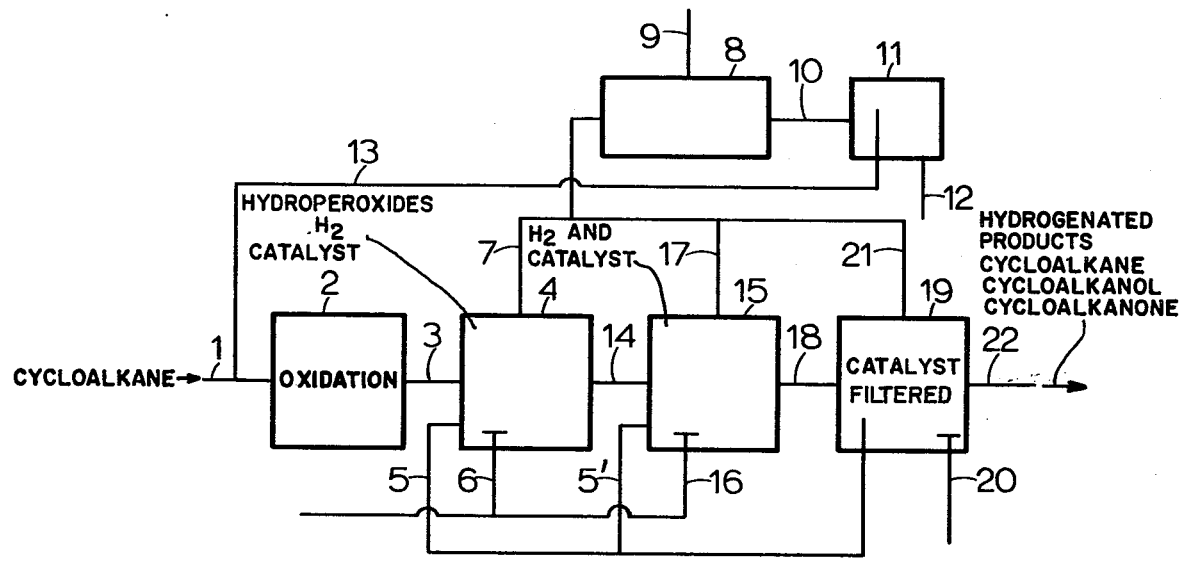

United States Patent [19]

van de Moesdijk et al.

[11] 3,927,108

[45] Dec. 16, 1975

[54] PROCESS FOR THE PREPARATION OF CYCLOALKANONES AND/OR CYCLOALKANOLS

[75] Inventors: Cornelis G. M. van de Moesdijk, Elsloo; Andreas M. J. Thomas, Kerkrade, both of Netherlands

[73] Assignee: Stamicarbon, B.V., Geleen, Netherlands

[22] Filed: Nov. 20, 1973

[21] Appl. No.: 417,635

[30] Foreign Application Priority Data
Nov. 23, 1972 Netherlands....................... 7215854
Nov. 3, 1973 Netherlands....................... 7315102

[52] U.S. Cl. ...... 260/586 P; 260/617 R; 260/631 R
[51] Int. Cl.$^2$..................... C07C 27/04; C07C 45/00; C07C 29/00
[58] Field of Search ........ 260/586 R, 586 B, 586 A, 260/631 R, 617 R

[56] References Cited
UNITED STATES PATENTS

| | | | |
|---|---|---|---|
| 2,497,349 | 2/1950 | Farkas et al. | 260/617 |
| 2,851,496 | 9/1958 | Cotes et al. | 260/586 B |
| 3,694,511 | 9/1972 | Nouvel | 260/586 R |

FOREIGN PATENTS OR APPLICATIONS

| | | |
|---|---|---|
| 6,502,597 | 9/1965 | Netherlands |
| 1,505,363 | 11/1967 | France.............. 260/586 R |

*Primary Examiner*—Norman Morgenstern
*Attorney, Agent, or Firm*—Cushman, Darby & Cushman

[57] ABSTRACT

A process for the preparation of cycloalkanones and/or cycloalkanols by catalytic hydrogenation of cycloalkyl hydroperoxides is disclosed. In the invented process use is made of a finely divided catalyst that is suspended in the reaction mixture and contains one or more noble metals from Group VIII of the Periodic System of Elements, preferably rhodium, platinum and/or palladium.

With the invented process a high reaction rate can be achieved already at a low reaction temperaturue and a low hydrogen pressure, while the desired products are obtained in a high yield. Very little catalyst is needed for achieving a given rate of reaction. The invention permits advantageous application of catalysts with very high noble-metal concentrations. Favourable alcohol/ketone ratios can be achieved.

The invention also offers solutions for specific problems which may occur in performing the invented process. Advantageous incorporation of the invented process into an overall process for the preparation of cycloalkanols and/or cycloalkanones from a cycloalkane via a cycloalkyl hydroperoxide is disclosed.

14 Claims, 2 Drawing Figures

PROCESS FOR THE PREPARATION OF CYCLOALKANONES AND/OR CYCLOALKANOLS

The invention relates to a process for the preparation of cycloalkanones and/or cycloalkanols by hydrogenation of cycloalkyl hydroperoxides.

A cyclohexane oxidation product consisting substantially of cyclohexanol and cyclohexanone can be prepared by oxidizing cyclohexane in the liquid phase with a gas containing molecular oxygen as the oxidation agent, and hydrogenating the oxidation mixture with hydrogen gas using a fixed bed of palladium on acid or neutral carrier as a hydrogenation catalyst.

Said prior art process has the drawback that the choice of the reaction conditions for the hydrogenation is fairly limited. As a consequence, the overall process cannot readily be optimized to a sufficient degree. In het prior art process fairly high reaction temperatures and hydrogen pressures are needed for achieving a reasonably fast rate of conversion, i.e. a temperature of at least 80°C and a hydrogen pressure of at least 10 atm. Even under these conditions a large quantity of palladium catalyst has to be used.

Furthermore, in the prior art process only limited palladium concentrations in the catalyst can be used. The catalyst to be used must contain no more than 0.05–0.10 % wt of palladium calculated to the weight of the catalyst, because at higher contents the achievable rate of conversion per gram of noble metal decreases. Recovering such a low concentration catalyst costs at least about 80 % of the price of the new catalyst and, as a consequence, does not or hardly pay the trouble. Palladium costs per unit of hydrogenation product are high.

A further point demanding attention in the preparation of cyclo-alkanones and/or cycloalkanols from cycloalkyl hydroperoxides is the ratio in which the ketone and the alcohol are obtained. For most applications the cycloalkanone is preferred to the cycloalkanol. The reaction product obtained by hydrogenating the cycloalkyl hydroperoxide according to the prior art contains the alcohol and the ketone in the ratio 9.6/1. This is a high and, hence, not particularly favourable value.

According to the invention, cycloalkanones and/or cycloalkanols are prepared by catalytic hydrogenation of cycloalkyl peroxides, the said process being characterized in that a finely divided catalyst containing a noble metal from group VIII of the Periodic System of the Elements is suspended in the reaction medium. Said group of noble metals comprises Ru, Rh, Pd, Os, Ir and Pt. Surprisingly it has been found now that with this process a high reaction rate can be achieved already at a low reaction temperature, say about 30 °C, and a low hydrogen pressure, say about 1 atm, while the desired products are obtained in a high yield. With the unnoble metals from group VIII of the Periodic System of the Elements Fe, Co and Ni the envisaged advantages are not obtained.

It is not necessary to employ low pressures and temperatures; the yield is high also at elevated temperatures and pressures. This implies that the reaction conditions can be chosen within a wide range, with the consequence that the invented process can be easily incorporated into an overall process for the preparation of cycloalkanols and/or cycloalkanones from a cycloalkane via a cycloalkyl hydroperoxide. In the process according to the invention much less catalyst is needed for achieving a given rate of reaction, under otherwise identical conditions.

Furthermore, the process according to the invention permits advantageous application of catalysts with much higher noble-metal concentrations than can be used in the prior art process. The decrease of the maximum production rate per gram of noble metal sets in at much higher contents, i.e. above about 15 % wt, depending on the particle size. In this case it does pay to recover the noble metal from the spent catalyst. This makes it possible to reduce the depletion of the limited natural resources of noble metal, as well as to effect a further decrease of the cost of noble metal per unit of hydrogenation product. Contents of between 5 and 15 % wt are preferred. The cost of recovering the applicable strongly concentrated catalysts amounts only to some 10 % of the price of new catalyst.

The process is suited for both batchwise and continuous operation. The continuous process can be excellently incorporated into a continuous process for the preparation of cycloalkanols and cycloalkanones via oxidation of a cycloalkane by means of molecular oxygen. In the invented process favourable alcohol ketone ratios can be achieved. A value of 5 can often be realized without any difficulty.

Noble metals particularly suited for use in the catalyst are palladium, rhodium and platinum. The noble metal is preferably deposited on a carrier such as carbon, kieselguhr, silica or alumina. Suited catalysts are e.g. palladium-on-carbon, palladium-on-kieselguhr, rhodium-on-kieselguhr, platinum-on-silica, and the like.

Combinations of two or more noble metals may also be used and offer advantages in some cases. Examples of applicable combinations are palladium-platinum, palladium-rhodium and rhodium-platinum. To facilitate the recovery of catalyst from the reaction products, it is preferred to employ a catalyst that can be readily filtered. A particularly suited catalyst consists of 5–15 % wt of palladium on carbon as a carrier.

Reaction temperatures of between 20° and 180°C are preferred. The higher the temperature, the higher the reaction rate. Reaction temperatures lower than 20°C or higher than 180°C may be used, but do not offer specific advantages. Above 120°C the thermal decomposition of the cycloalkyl hydroperoxide proceeds at a noticeable rate. This thermal decomposition also gives cycloalkanol and cycloalkanone, but the yield is much lower than in the hydrogenation. However, above 120°C the hydrogenation reaction usually proceeds so fast already that the rate of the thermal decomposition can be neglected, with the consequence that high overall yields can be achieved also at temperatures above 120°C. Application of a temperature higher than the boiling point of the cycloalkane/water azeotrope under the prevailing conditions is advantageous if the hydrogenation reaction is carried out in the presence of cycloalkane. The reaction water can then be easily removed. In choosing the reaction temperature, the problem of removal of the heat of reaction also plays a role. This removal is preferably effected by evaporating a liquid component of the reaction mixture, such as the distributing agent and/or the reaction water. In most cases a reaction temperature of between 50° and 100°C is to be recommended.

The hydrogen pressure is not critical. For practical considerations preference is given to a hydrogen partial pressure of 0.2 to 2 atm. The higher the hydrogen partial pressure, the faster the rate of reaction. Hydrogen partial pressures of above 10 atm can be used, but do not offer specific advantages. Hydrogen pressures higher even than 50 atm can be applied, but this involves high costs of compression and equipment. Operation at hydrogen partial pressures below 0.1 atm is possible, but unpractical. The total working pressure is not critical, but should be such that a liquid phase will be maintained in the system during the hydrogenation reaction. Application of atmospheric or slightly elevated total pressure, e.g. of 1–2 atm, enables the hydrogenation to be readily integrated with other process steps like filtration, distillation etc.

Reaction time for effecting substantially complete conversion of cycloalkyl hydroperoxide in the invented process is short. Even at a temperature as low as 30°C and a hydrogen partial pressure of 1 atmosphere, at a normal catalyst concentration in the order of 1–10 g of catalyst/litre and an initial peroxide concentration of 200–2000 mmoles/kg in the corresponding cycloalkane used as a solvent, 95 % conversion can be achieved in a reaction time of at most 10 minutes.

The cycloalkyl hydroperoxide to be converted is preferably derived from a cycloalkane containing 5–12 carbon atoms in the ring. Cycloalkyl hydroperoxides derived from cyclohexane or cyclododecane are most preferred.

The reaction medium in which the catalyst is suspended may be any suited inert liquid medium in which the cycloalkyl hydroperoxide is soluble or, at least, dispersible. Suited reaction media are e.g. inert liquid aromatic, aliphatic or naphthenic hydrocarbons, like benzene, toluene, tetrahydronaphthalene, paraffin oil and, especially, the cycloalkane from which the cycloalkyl hydroperoxide has been derived. Water, alcohols and mixtures thereof may also be used, as well as homogeneous mixtures of water, one or several alcohols and one or several hydrocarbons. The initial peroxide concentration normally lies between 1 and 30 % wt, preferably between 5 and 15 % wt.

A solution of a cycloalkyl hydroperoxide in the corresponding cycloalkane can be prepared by oxidizing a cycloalkane in the liquid phase at elevated temperature and pressure with a gas containing molecular oxygen. High concentrations of peroxides (mainly cycloalkyl hydroperoxide) can be obtained by executing the oxidation reaction in the absence of catalyzing metal compounds. One may use a reaction vessel with an inert inner wall, e.g. a wall made of aluminium, tantalum, glass, enamel or, preferably, phosphated steel. Under certain conditions it may, however, be advantageous not to exclude transition metal ions completely, or rather to add such ions deliberately. The oxidation reaction will then proceed at a faster rate, while the metal ion concentration may yet be low enough for enabling the desired peroxide concentration in the mixture to be reached and preserved.

The oxidation reaction is preferably carried out at a temperature between 120° and 200°C. The reaction pressure is not critical, but should be high enough for maintaining a liquid phase in the system. The degree of conversion calculated on the cycloalkane feed preferably lies between 1 and 12 %.

If desired, the cycloalkyl hydroperoxide can be recovered from the crude reaction mixture for example by extraction with a basic solution, e.g. sodium hydroxide solution, and subsequent acidification and further treatment of the extract. Upon recovery the cycloalkyl hydroperoxide can be brought into a suited solvent, and then be used as a starting material in the process according to the invention. However, it is also possible to use the crude oxidation mixture as a starting material, if necessary after evaporation. If such a mixture contains any other peroxides than cycloalkylhydroperoxides, these are also reduced in the invented process; for example, ω-hydroperoxy-alkane carboxylic acids are converted into the corresponding ω-hydroxy-carboxylic acids.

A particularly suited integrated process for the preparation of cycloalkanones and/or cycloalkanols from cycloalkanes comprises oxidation of the cycloalkane in the liquid phase with a gas containing molecular oxygen at a temperature of 120°–200° and elevated pressure until a solution containing cycloalkyl hydroperoxide is obtained, reduction of the pressure with the result that part of the cycloalkane evaporates and the temperature decreases, and subsequent hydrogenation of the concentrated solution containing peroxide in the presence of a group VIII noble metal catalyst suspended in the reaction medium. During the hydrogenation the heat of reaction can be carried off by evaporation of reaction water and cycloalkane. In a continuous process the water concentration in the hydrogenation zone will establish at a given, in principle constant value. The hydrogenation is then preferably carried out at the boiling point of the water-cycloalkane mixture under the prevailing conditions. The evolving vaporous water-cycloalkane mixture can be condensed and separated into layers, whereupon the organic layer can be recycled to the oxidation or hydrogenation step.

If the cycloalkane is cyclopentane, cyclohexane or cycloheptane, the amount evaporating during the abovementioned expansion of the oxidation mixture to about 1 atm pressure will be such to cause the temperature to decrease to 60–100°C. This is precisely a very suited temperature region in which to effect the hydrogenation according to the invention. It is efficient, though not essential, to remove at least part of the impurities from the crude oxidation mixture before or, preferably, after the expansion, for example by washing said mixture with water or an aqueous solution. Fouling of the hydrogenation catalyst can thus be counteracted. The washing process can be carried out e.g. in one or several mixer/separators, but preferably in a pulsed column in counter-current.

The hydrogenation of cycloalkyl hydroperoxides yields water as a reaction product. Further, water catalytic be present already in the starting material. Said water may have an interfering effect, because an aqueous phase may separate out in the reaction mixture. This aqueous phase may absorb a large portion of the catalystic material, and adhere to the wall of the reaction vessel. The hydrogenation rate will then decrease rapidly.

This trouble can be obviated by removing the reaction water during the hydrogenation. To this end use might be made of a chemical drying agent, but a simpler way is to remove the water in vapour form from the reaction mixture, preferably, as described above, in the form an azeotrope with the hydrocarbon used as distributing agent. The evolution of vapour from the reaction mixture should be strong enough to permit so fast an elimination of the water formed that the water concentration in the reaction medium will remain at, or below, the saturation concentration. It is also possible to eliminate the water by stripping with hydrogen and- /or an inert gas.

Another possibility is to include in the reaction mixture a substance that will increase the dispersibility of water in the organic phase. For example, a surfactant, e.g. a synthetical soap, may be added to the reaction mixture. The same effect can be obtained by adding a substance that is miscible with the organic phase, and increases the solubility of water in the organic phase, for example a lower alcohol containing 1–4 carbon atoms per molecule. Particularly suited are methanol, ethanol, propanol-2 and tertiary butanol.

The adverse effect produced by occurrence of a separate aqueous phase can be largely suppressed by continuously, or at least periodically, washing down the water and catalyst particles that have deposited on the wall; this can be done for example with the fresh reaction mixture to be supplied.

A smooth course of the process according to the invention depends to a high degree on the filtration properties of the suspended catalyst. After the reaction, the suspended catalyst should be removed from the reaction mixture. This can be done by any known procedure employed for eliminating a solid substance from a liquid, e.g. by centrifugation, settling and decantation etc., but preference will be given in practice to filtration; if the hydrogenation is carried out as a continuous process, this filtration will of course also be carried out continuously. From Applicant's experiments it has now appeared that in the present process the suspended catalyst tends to lose its good filtration properties after a few cycles of suspending the catalyst in the reaction medium, hydrogenating, removing the catalyst from the product mixture by filtration, and resuspending in fresh starting material, with the result that, if the invented process is carried out as a continuous process, a proper course of the process is impeded. This difficulty can be obviated by employing a combination of the following measures:

1. using a liquid hydrocarbon as the distributing agent in the reaction medium,
2. keeping the water concentration in the reaction medium at, or below, the saturation concentration,
3. after the partial or complete hydrogenation of the cycloalkyl hydroperoxide, removing the catalyst by filtration under such conditions that substantially no hydrogenation of the cycloalkyl hydroperoxide takes place.

Any substantial hydrogenation of cycloalkyl hydroperoxide during filtration of the catalyst can be prevented for example by performing the filtration at so low a temperature that no reaction will take place, by removing hydrogen from the suspension to be filtered, e.g. by stripping with an inert gas, by converting substantially all of the cycloalkyl hydroperoxide into cycloalkanone and/or cycloalkanol before reaching the filtration zone, or by a combination of these or suchlike measures. The preferred degree of conversion of the cycloalkyl hydroperoxide is at least 99 %.

If the abovementioned combination of measures is applied the catalyst will retain its good filtration properties over many cycles of suspending the catalyst in the reaction medium, hydrogenating, removing the catalyst from the product mixture by filtration, and resuspending of the catalyst in fresh starting material. An undisturbed course of the continuous production process over a long period of time can thus be achieved.

It is recommendable not to remove all of the water from the reaction mixture. For every cycloalkyl hydroperoxide there exists a range in which the water concentration is optimum; higher concentrations may give rise to the drawbacks mentioned above, whereas lower concentrations may cause the hydrogenation reaction to proceed less smoothly. It is efficient, therefore, to conduct the hydrogenation reaction as a continuous process under such conditions of temperature and pressure as will ensure that the amount of water leaving the reaction vessel in vapour form — e.g. as an azeotrope with the cycloalkane present as distributing agent and corresponding to the cycloalkyl hydroperoxide in question — is precisely such that the water concentration in the establishing stationary state will lie within the optimum range.

For this to be realized, some heat may have to be introduced into the hydrogenation reactor from outside. The exact choice of the reaction conditions depends on a great many variables, such as the type of the cycloalkyl hydroperoxide, its concentration in the reaction mixture, the type and concentration of the catalyst, the type of the distributing agent etc. Those skilled in the art will be capable of determining the optimum conditions for each individual case by means of some simple experiments. The invention will be elucidated in the following examples, without, however, being limited thereto in any way whatsoever.

EXAMPLE I

Into a reaction vessel provided with a stirrer, a gas inlet tube and a reflux cooler, and placed in a thermostat, 100 ml of a solution of cyclohexyl hydroperoxide in cyclohexane containing 629 mgeq/kg of peroxide and having a temperature of 30°C is introduced. 100 mg of a finely divided palladium-on-carbon catalyst containing 10 % wt of Pd is added to this solution. The particle size of the catalyst, defined as $\bar{d}_{vs}$ determined by Scholten and van Montfoort's CO-adsorption method, J. of Catalysis 1 (1962), 85–92, equals 20–200 A. The stirring rate is set at 2000 rpm, and pure hydrogen of 1 atm pressure is introduced as quickly as it is taken up. After 14 minutes stirring at 30°C, 1.03 l of hydrogen has been absorbed, and 100 % of the peroxide has been converted to cyclohexanol and cyclohexanone with a yield of 101 %. The alcohol/ketone ratio equals 9.0.

EXAMPLE II

By oxidation of cyclohexane in the liquid phase with air as the oxidation agent and subsequent concentration by evaporation, an oxidation mixture is prepared which, besides cyclohexane, contains 580 mmoles/kg of cyclohexyl hydroperoxide, 457 mmoles/kg of cyclohexanol, 352 mmoles/kg of cyclohexanone and 152 mgeq/kg of organic acids. This mixture is hydrogenated in the way described in Example I. After 90 minutes, 0.75 l of hydrogen has been taken up and 99 % of the peroxide been converted. The reaction mixture now contains 1000 mmoles/kg of cyclohexanol, 481 mmoles of cyclohexanone and 146 mgeq/kg of organic acids. The yield equals 116 %, calculated to converted peroxide.

During the reaction, part of the catalyst deposits on the wall of the reaction vessel. This is attended with loss of catalytic activity. This can be prevented by addition of a surfactant; e.g. RBS 25. In an experiment corresponding to this example, the take-up rate of hydrogen was measured as a function of time. After 4 minutes, the take-up rate had decreased from 920 l $H_2$ per gram of Pd per hour to 340 l $H_2$ per gram of Pd per hour. Immediately after 3 ml of 1 % wt RBS-25 solution had been added, the take-up rate rose to 790 l $H_2$/g of Pd/h.

EXAMPLE III

Example II is repeated. After 7½ minutes, 0.63 l of hydrogen has been taken up and 98 % of the peroxide has been converted. The reaction mixture now contains 960 mmoles/kg of cyclohexanol, 454 mmoles/kg of cyclohexanone and 146 mgeq/kg or organic acids. The alcohol/ketone ratio calculated for cyclohexanol and cyclohexanone formed during the hydrogenation consequently equals 5.0. The yield is 104 %, calculated to converted peroxide. In the short reaction time no catalyst deposits on the wall of the reaction vessel.

EXAMPLE IV

Example II is repeated, but with no more than 25 mg of the palladium-on-carbon catalyst. After 14 minutes, 0.16 l of hydrogen has been taken up and 76 % of the peroxide has been converted. The reaction mixture now contains 761 mmoles/kg of cyclohexanol, 410 mmoles/kg of cyclohexanone and 150 mgeq/kg of organic acids. The yield equals 82 %.

EXAMPLE V

By oxidation of cyclohexane in the liquid phase with air as the oxidation agent and subsequent concentration by evaporation, an oxidation mixture is prepared which, besides cyclohexane, contains 575 mmoles/kg of cyclohexyl hydroperoxide, 436 mmoles/kg of cyclohexanol, 322 mmoles/kg of cyclohexanone and 133 mgeq/kg of organic acids.

100 ml of this oxidation mixture and 3 ml of a 1 % wt RBS-25 solution are transferred to a reaction vessel, 100 mg of a palladium-on-carbon catalyst, containing 10 % wt of Pd, is added to it, the mixture is stirred at 2000 rpm and so much hydrogen of 30°C and 1 atm pressure is fed into it as can be taken up. The catalyst contains 4.1 % wt of Pd and 1.1 % wt of Pt, and has a particle size, defined in the way specified in example I, of 20–200 A. After 25 min, 0.88 l of hydrogen has been taken up and 99 % of the peroxide has been converted. The reaction mixture now contains 900 mmoles/kg of cyclohexanol, 403 mmoles/kg of cyclohexanone and 107 mgeq/kg of acids. The yield equals 96 % calculated to converted peroxide. No catalyst deposits on the wall of the reaction vessel.

EXAMPLE VI

By oxidation of cyclohexane in the liquid phase with air as the oxidation agent, and subsequent washing with water and evaporation, an oxidation mixture is prepared which, besides cyclohexane, contains 489 mmoles/kg of cyclohexyl hydroperoxide, 179 mmoles/kg of cyclohexanol, 103 mmoles/kg of cyclohexanone and 39 mgeq/kg of organic acids.

100 ml of this oxidation mixture is fed into a reaction vessel, and 100 mg of a rhodium-on-carbon catalyst is added to it, whereupon the mixture is stirred at 2000 rpm and so much hydrogen of 30°C and 1 atm pressure is passed through as quickly it is taken up. The catalyst contains 5 % wt of Rh and has a particle size, defined as in Example I, of 20–200 A. After 45 minutes 0.75 l of hydrogen has been taken up, and 99 % of the peroxide has been converted. The reaction mixture now contains 647 mmoles/kg of cyclohexanol, 174 mmoles/kg of cyclohexanone and 35 mgeq/kg of acids. The yield equals 112 % calculated to converted peroxide.

EXAMPLE VII

Example VI is repeated with a platinum-on-carbon catalyst, containing 5 % wt of Pt, being used instead of a rhodium-on-carbon catalyst. The mixture subjected to the hydrogenation further contains 5 % by volume of ethanol. After 64 minutes, the degree of conversion of the peroxide equals 99 %, the yield being 80 %. No catalyst deposits on the wall of the reaction vessel.

EXAMPLE VIII

An evaporated cyclohexane oxidation mixture which, besides cyclohexane, contains 634 mmoles/kg of cyclohexyl hydroperoxide, 317 mmoles/kg of cyclohexanol, 287 mmoles/kg of cyclohexanone and 112 mgeq/kg of organic acids is subjected to a hydrogenation treatment in the way described in Example VII. However, use is made of a palladium-on-alumina catalyst with a particle size of 20–200 A, defined as in Example I, and containing 5 % wt of Pd. After 61 minutes, 99 % of the peroxide has been converted. The reaction mixture now contains 808 mmoles/kg of cyclohexanol, 331 mmoles/kg of cyclohexanone and 83 mgeq/kg acids. The yield equals 87 %. No catalyst deposits on the wall of the reaction vessel, which does happen if no ethanol is present.

EXAMPLE IX

An evaporated cyclohexane oxidation mixture which, besides cyclohexane contains 543 mmoles/kg of cyclohexyl hydroperoxide, 117 mmoles/kg of cyclohexanol, 194 mmoles/kg of cyclohexanone and 103 mgeq/kg of organic acids, is subjected to a hydrogenation treatment in the presence of 1000 mg/l of a Pd-on-kieselguhr catalyst, containing 1 % wt of Pd, with a particle size of 20–200 A, defined as in Example I. The temperature amounts to 60°C, the stirring rate is 2000 rpm. Hydrogen gas of 1 atm pressure is led through the reaction mixture at the rate of 150 l/h.

After 30 minutes, the reaction mixture still contains 40 mmoles/kg of cyclohexyl hydroperoxide and, further, 710 mmoles/kg of cyclohexanol, 214 mmoles/kg of cyclohexanone and 103 mgeq/kg of acids.

EXAMPLE X

Reference is made to FIG. 1. In oxidation section 2, cyclohexane supplied through lines 1 and 13 is oxidized in the liquid phase with air as the oxidation agent; the oxidation mixture is concentrated by evaporation and washed with water, and then contains 700 mmoles/kg of cyclohexyl hydroperoxide.

Said oxidation mixture is passed as a continuous flow along line 3 to a reaction vessel 4 provided with a stirrer (not shown). The residence time in 4 is 15 minutes; the temperature in the reaction vessel is kept at 60°C. Along line 5 a continuous flow of finely divided palladium-on-carbon catalyst containing 10 % wt of Pd is supplied to the reaction vessel, the feed rate being so chosen that the catalyst concentration remains equal to 1 g/l. Via a gas distributing member, hydrogen supplied along line 6 is fed to the reaction vessel at a rate of 200 l/h. The total pressure is 1 atm; the hydrogen partial pressure adjusts itself at 0.3 atm.

90 % of the cyclohexyl hydroperoxide is converted. The amount of water vapour leaving the reaction vessel along line 7 together with the offgas is so large that no separate liquid water phase is formed. In condensor 8, cyclohexane and water are removed from the offgas by condensation. Uncondensable gases leave 8 via 9. Along line 10, the condensate flows to separator 11, where it is separated into an aqueous layer and an organic layer. The aqueous layer is carried off along 12, the organic layer is returned through line 13 to the cyclohexane oxidation section 2.

The liquid phase, plus the catalyst suspended therein, leaving reaction vessel 4 is fed via line 14 to a second hydrogenation reactor 15, in which the same reaction conditions prevail as in the first hydrogenation reactor 4. Via 5' additional catalyst can be supplied to 15, but this is not done in the present example. In 15, cyclohexyl hydroperoxide that has escaped conversion in 4 is converted to 90 %. The offgas withdrawn from 15 via 17 is treated as described above; the liquid phase leaving reactor 15 along 18 is filtered over chromium nickel filter candles in filtration section 19. The catalyst filtered off in 19 is fed back to the hydrogenation process via line 5. Via 20, 75 l/h of nitrogen (an other inert gas can also be used) is supplied to the filtration section. Under these conditions substantially no hydrogenation takes place on the filter candles. The offgas flowing off via 21 is supplied to condensor 8 for recovery of cyclohexane vapour thereof. The reaction mixture obtained from 22 — consisting mainly of cyclohexanone, cyclohexanol and cyclohexane — can be further processed for recovery of cyclohexanone and cyclohexanol.

In an experiment corresponding to the present example, filtration still proceeded without any trouble after 1 month of continuous operation.

EXAMPLE XI

Use is made of the process outlined in Example X; the temperature, however, is 30°C instead of 60°C. In order that in this case, too, a hydrogen partial pressure of 0.3 atm can be achieved at 1 atmosphere total pressure, the hydrogen gas is diluted with nitrogen. The residence time is extended to such a degree that in this case, too, the total conversion over the two hydrogenation reactors amounts to 99 %.

Under these conditions, the removal of reaction water from the first reactor does not go fast enough for preventing that a separate aqueous phase is produced. Within a few hours the filter candles get blocked up, and the continuous process has to be terminated.

EXAMPLE XII

Figure 2:
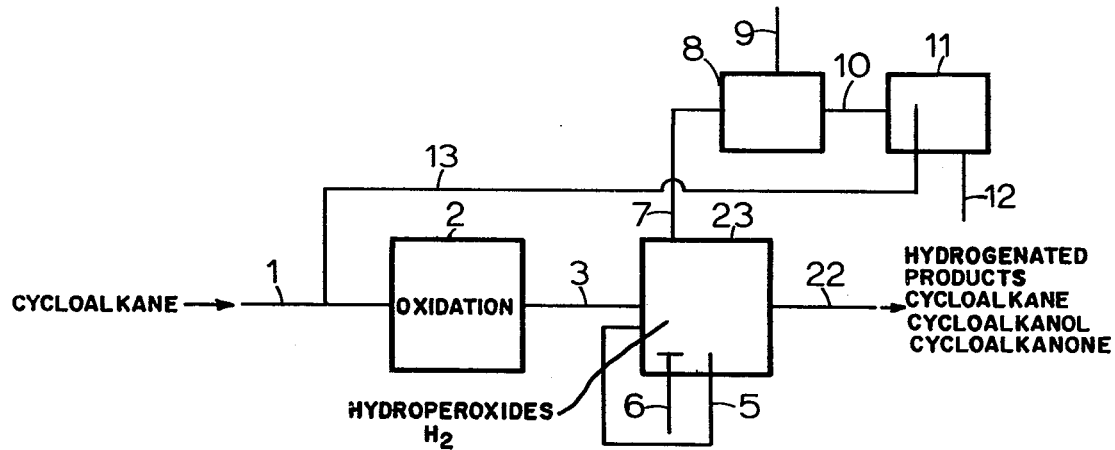

Reference is made to FIG. 2, in which corresponding parts are marked in the same way as in FIG. 1. The process outlined in Example X is employed, with the difference that, instead of vessels 4, 15 and 19, only one hydrogenation reactor, 23, is employed, and the filter candles are accommodated inside this single reactor. The rate at which the water is removed is fast enough to prevent formation of an separate aqueous phase, but hydrogenation also takes place on the filter candles, and the reaction water formed is absorbed in the filter candle pores. The continuous process has to be terminated within a few hours, owing to blockage of the filter candles.

What we claim is:

1. A process for the preparation of cycloalkanones and/or cycloalkanols by liquid phase catalytic hydrogenation of cycloalkane hydroperoxides, comprising mixing cycloalkane hydroperoxides in an inert reaction medium comprising a distributing agent which is an inert liquid aromatic, aliphatic or naphthenic hydrocarbon, wherein the hydroperoxide concentration is 1 to 30 weight percent,
    with a finely divided catalyst, said catalyst comprising a noble metal of Group VIII of the Periodic System of Elements, that is suspended in the reaction medium to form a mixture;
    introducing hydrogen into the mixture maintained at temperatures between 20° to 180°C, wherein the hydrogen partial pressure is between 0.1 to 50 atmospheres;
    and removing water continuously from the hydrogenation reaction mixture in the form of a vaporous azeotrope with the distributing agent.
2. The process of claim 1 wherein the inert reaction medium additionally contains a lower alkanol of 1 to 4 carbon atoms.
3. The process of claim 1 which includes the subsequent step of filtering the catalyst from the reaction mixture, after hydrogenation, under such conditions to halt further hydrogenation.
4. Process according to claim 1, characterized in that a catalyst containing rhodium, platinum and/or palladium is employed.
5. Process according to claim 1, characterized in that a palladium-on-carbon catalyst containing 5–5 % wt of Pd is used.
6. Process according to claim 1, characterized in that the cycloalkane corresponding to the cycloalkyl hydroperoxide is used as the distributing agent.
7. Process according to claim 6 wherein the reaction is undertaken at a temperature above the boiling point of the cycloalkane-water azeotrope under the prevailing conditions.
8. Process according to claim 7, characterized in that the reaction is carried out at a temperature between 50° and 100°C.
9. Process according to claim 1, characterized in that the reaction is carried out at a partial hydrogen pressure of at most 10 atm.
10. Process according to claim 1, characterized in that the reaction is carried out at a total pressure between 1 and 2 atm.
11. Process according to claim 1, characterized in that the initial peroxides concentration lies between 5 and 30 % wt.
12. Process according to claim 1, characterized in that particles depositing on the wall of the hydrogenation reaction vessel are washed down with the mixture fed to the reaction vessel.
13. Process according to claim 3, characterized in that the cycloalkyl hydroperoxide is converted to at least 99 % in the hydrogenation zone before the reaction mixture is supplied to the filtration zone.
14. Process according to claim 3, characterized in that, prior to filtering the suspension obtained after hydrogenation of the cycloalkyl hydroperoxide, hydrogen is removed from it by stripping with an inert gas.

* * * * *

UNITED STATES PATENT OFFICE
CERTIFICATE OF CORRECTION

Patent No. 3,927,108　　　　　　　　　Dated December 16, 1975

Inventor(s) Cornelis G.M. van de Moesdijk and Andreas M.J. Thomas

It is certified that error appears in the above-identified patent and that said Letters Patent are hereby corrected as shown below:

In claim 5, line 2, after "containing" delete "5-5" and substitute therefor --5-15--.

Signed and Sealed this sixth Day of April 1976

[SEAL]

Attest:

RUTH C. MASON
Attesting Officer

C. MARSHALL DANN
Commissioner of Patents and Trademarks